(12) United States Patent
Ashley et al.

(10) Patent No.: US 6,549,354 B1
(45) Date of Patent: Apr. 15, 2003

(54) ACQUISITION SIGNAL ERROR ESTIMATOR

(75) Inventors: Jonathan Ashley, Los Gatos, CA (US);
Stephen J. Franck, Felton, CA (US);
Razmik Karabed, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/653,235

(22) Filed: Aug. 31, 2000

Related U.S. Application Data

(63) Continuation-in-part of application No. 09/480,314, filed on Jan. 10, 2000.
(60) Provisional application No. 60/152,382, filed on Sep. 3, 1999, and provisional application No. 60/129,654, filed on Apr. 16, 1999.

(51) Int. Cl.⁷ .................................................. G11B 5/09
(52) U.S. Cl. ............................. 360/46; 360/51; 360/67; 360/65
(58) Field of Search ............................. 360/51, 46, 67, 360/65, 53; 714/769, 770; 375/229, 230, 232, 233, 344, 345, 362

(56) References Cited

U.S. PATENT DOCUMENTS

| | | | |
|---|---|---|---|
| 4,897,740 A | | 1/1990 | Suzuki |
| 4,939,685 A | * | 7/1990 | Feintuch ..................... 708/322 |
| 5,379,160 A | | 1/1995 | Otani |
| 5,726,818 A | | 3/1998 | Reed et al. |
| 5,760,984 A | | 6/1998 | Spurbeck et al. |
| 5,812,334 A | | 9/1998 | Behrens et al. |
| 5,835,295 A | | 11/1998 | Behrens |
| 5,892,632 A | | 4/1999 | Behrens et al. |
| 5,909,332 A | | 6/1999 | Spurbeck et al. |

* cited by examiner

*Primary Examiner*—Alan T. Faber
(74) *Attorney, Agent, or Firm*—Fish & Richardson P.C.

(57) ABSTRACT

A system and method for acquisition signal error estimation is provided which uses one or more past values of the sequence to determine the nearest ideal sample value. According to one embodiment, four consecutive samples are used. According to another embodiment, two samples are used. The acquisition signal error estimator maybe used in conjunction with gain, DC offset, or magneto-resistive asymmetry control loops in a sampled amplitude read channel.

8 Claims, 3 Drawing Sheets

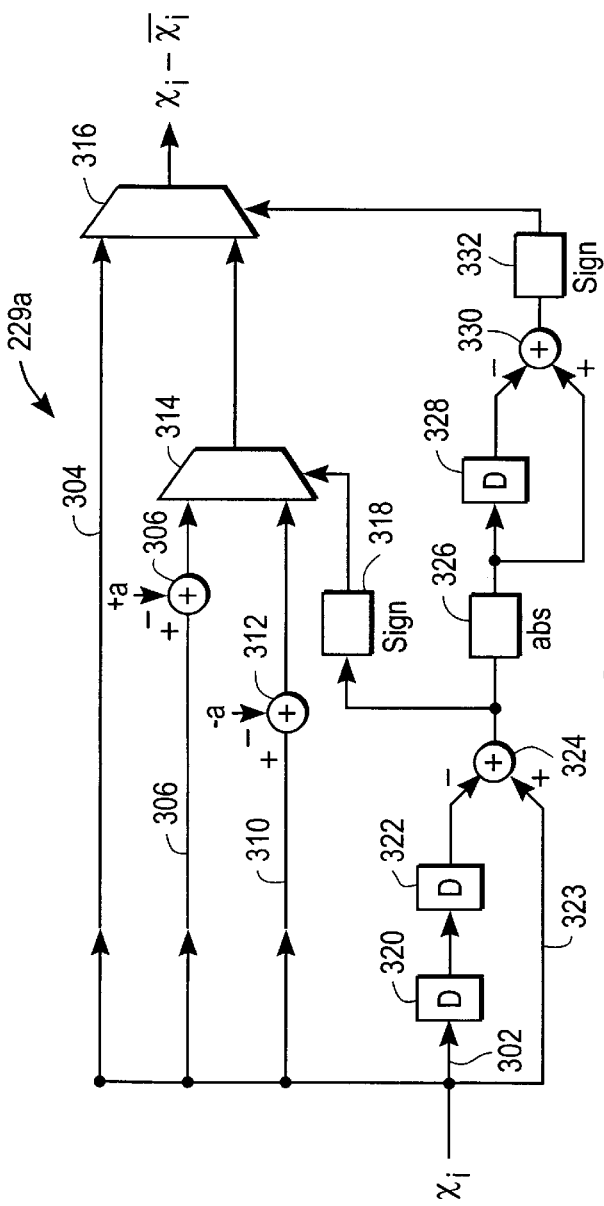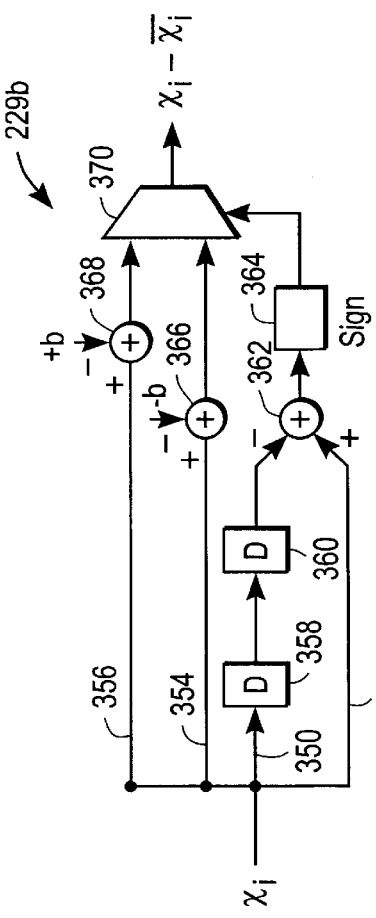
FIG. 3A
FIG. 3B

ACQUISITION SIGNAL ERROR ESTIMATOR

CROSS-REFERENCE TO RELATED APPLICATIONS

This application claims priority from U.S. Provisional Application Ser. No. 60/152,382, filed Sep. 3, 1999 and from U.S. Provisional Application Ser. No. 60/129,654, filed Apr. 16, 1999, and is a continuation-in-part of U.S. Pat. application Ser. No. 09/480,314, filed Jan. 10, 2000, titled "An Acquisition Signal Error Estimator," all of which are hereby incorporated by reference in their entireties as if fully set forth herein.

BACKGROUND OF THE INVENTION

1. Filed of the Invention

The present invention relates to magnetic recording and, particularly, to an improved error estimator for a sampled amplitude read channel.

2. Description of the Related Art

Sampled amplitude detectors used in magnetic recording require timing recovery in order to correctly extract the digital sequence. As shown in FIG. 1, data sectors 100 on magnetic disks are formatted to include an acquisition preamble 102, a sync or synchronization mark 104, and user data 106. Timing recovery uses the acquisition preamble 102 to acquire the correct sampling frequency and phase before reading the user data 106. The synchronization mark 104 demarcates the beginning of the user data. The preamble 102 is written using the periodic non-return-to-zero (NRZ) sequence 001100110011 . . . which causes the pattern of magnetization SSNNSSNNSSNN . . . to be written on the magnetic medium. The pattern is periodic, having period 4T, where T is the bit period. The pattern is sometimes called a 2T pattern because the interval between successive magnetic field direction transitions is 2T. During the read operation, the sequence of samples $[x_i, x_{i+1}, \ldots]$, produced by the preamble is also of period 4T. In the case of PR4 (partial response) equalization, the sinusoid is ideally sampled at $\pi/4$, $3\pi/4$, $5\pi/4$, $7\pi/4$ and so on, resulting in an equalized sequence of $[1, 1, -1, -1, 1, 1, -1, -1, 1, 1, \ldots]$. In the case of EPR4 (extended partial response) equalization, the sinusoid is ideally sampled at phases $0, \pi/2, \pi, 3\pi/2$ and so on, which results in the equalized sequence $[2, 0, -2, 0, 2, 0, -2, 0, 2, 0, \ldots]$. In the general case of $E^{2n}PR4$, where n is a non-negative integer, the sinusoid is ideally sampled at phases $\pi/4$, $3\pi/4$, $5\pi/4$, $7\pi/4$ and so on, resulting in an equalized sequence of $[2^n, 2^n, -2^n, -2^n, 2^n, 2^n, -2^n, -2^n, \ldots]$. For $E^{2n+1}PR4$ equalization, the sinusoid is ideally sampled at phases $0, \pi/2, \pi, 3\pi/2$ and so on, which results in the equalized sequence $[2^{n+1}, 0, -2^{n+1}, 0, 2^{n+1}, 0, -2^{n+1}, \ldots]$.

Conventionally, the error between the received sample and its ideal value is estimated as $x_i - \bar{x}_i$ where $x_i$ is the received sample value and $\bar{x}_i$ is the nearest ideal sample value to the received value $x_i$. The nearest ideal sample value $\bar{x}_i$ is computed simply by comparing the received value $x_i$ to each of the ideal signal levels and declaring $\bar{x}_i$ to be the closest ideal level (i.e., the ideal level that minimizes the absolute value $|x_i - \bar{x}_i|$ of the error). This is referred to as a slicer or threshold detector estimate.

However, the slicer estimate is disadvantageous in that it is sensitive to distortions in gain, DC offset, and magneto-resistive signal asymmetry. As such, there is a need for an improved error estimator.

SUMMARY OF THE INVENTION

These and other drawbacks in the prior art are overcome in large part by a system and method according to the present invention. An improved system and method for acquisition signal error estimation is provided which uses one or more past values of the sequence to determine the nearest ideal sample value. According to one embodiment, three consecutive samples are used. According to another embodiment, two consecutive samples are used. Finally, according to another embodiment of the invention, consecutive samples are used, but no slicer estimate is required.

BRIEF DESCRIPTION OF THE DRAWINGS

A better understanding of the invention is obtained when the following detailed description is considered in conjunction with the following drawings in which:

FIG. 3A, FIG. 3B, and FIG. 3C are diagrams of exemplary acquisition signal error estimators according to the present invention.

DETAILED DESCRIPTION OF THE INVENTION

Figure 2:
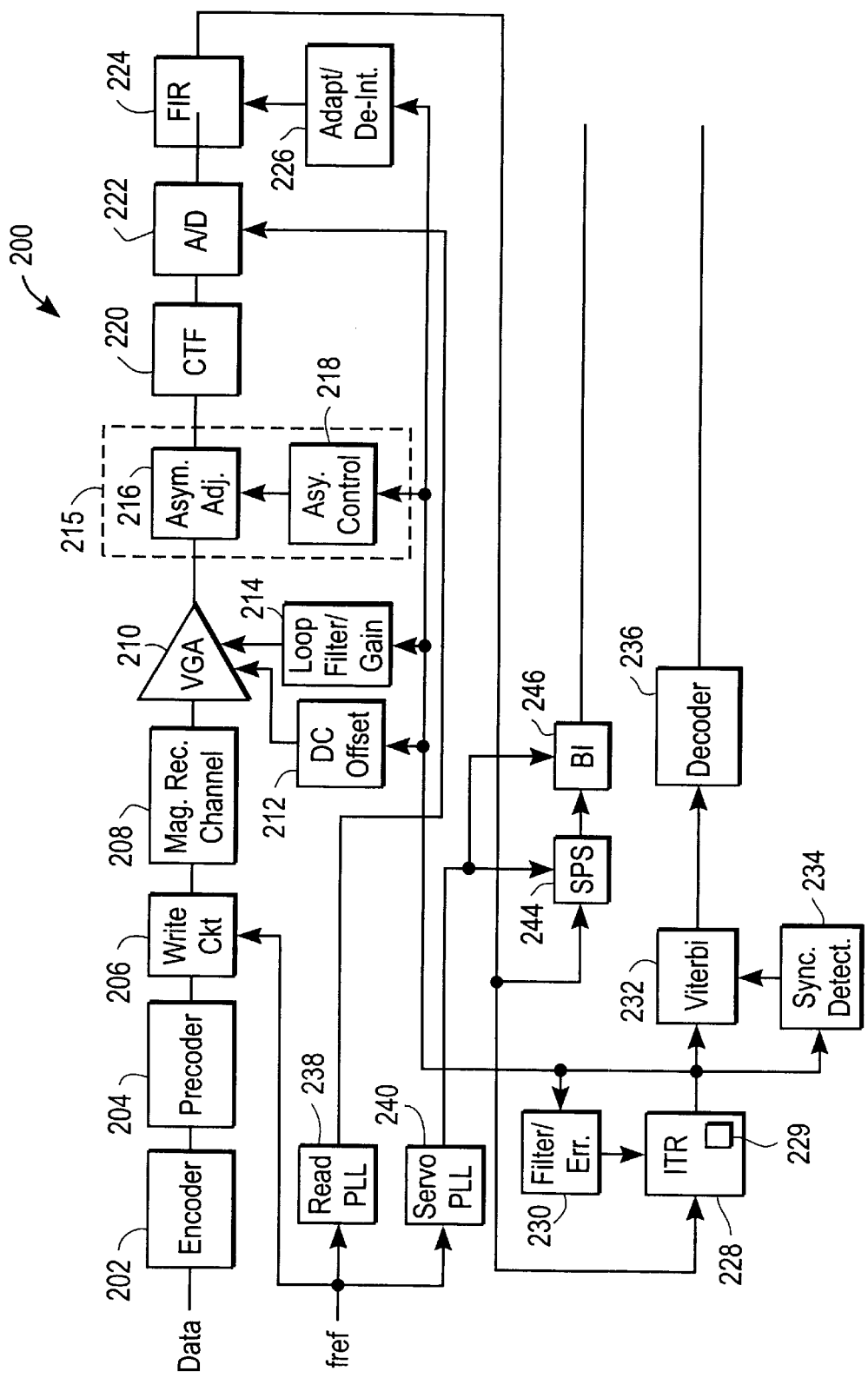
FIG. 2 is a block diagram of an exemplary read/write channel according to an embodiment of the invention.

FIGS. 2–3 illustrate an improved acquisition signal error estimator according to an implementation of the present invention. The acquisition signal error estimator uses a plurality of received samples to estimate the signal error. Turning now to the drawings and, with particular attention to FIG. 2, a block diagram of a sampled amplitude read channel according to an embodiment of the invention is shown and identified by the reference numeral 200. During a write operation, data are written onto the media. The data are encoded in an encoder 202, such as an RLL or other encoder. A precoder 204 precodes the sequence to compensate for the transfer function of the magnetic recording channel 208 and equalizing filters. The write circuitry 206 modulates the current in the recording head coil to record a binary sequence onto the medium. A reference frequency $f_{ref}$ provides a write clock to the write circuitry 206.

The bit sequence is then provided to a variable gain amplifier 210 to adjust the amplitude of the signal. DC offset control 212 and loop filter/gain error correction 214 according to the present invention may be provided to control the adjustment of the VGA 210. Further, an asymmetry control unit 215 including an asymmetry adjustment unit 216 and asymmetry control 218 may be provided to compensate for magneto-resistive asymmetry effects. It is noted that, while described in the context of gain correction, the teachings of the present invention are equally applicable for use in the DC offset and asymmetry control loops. As will be described in greater detail below, the acquisition signal error estimator uses a plurality of received samples to estimate the signal error.

Turning back to FIG. 2, the signal is then provided to a continuous time filter 220, which may be a Butterworth filter, for example, to attenuate high frequency noise and minimize aliasing into baseband after sampling. The signal is then provided to an analog-to-digital converter 222 to sample the output of the continuous time filter 220.

A finite impulse response filter 224 provides additional equalization of the signal to the desired response. The output of the FIR 224 is provided to an interpolated timing recovery unit 228, including an acquisition signal error estimator 229 according to the present invention, which is used to recover the discrete time sequence. The output of the interpolated timing recovery unit is used to provide a feedback control to the DC offset control 212, the gain error 214, the asymmetry control 218 and the FIR 224 control 226. The output of the interpolated timing recovery 228 is provided to a Viterbi detector 232 to provide maximum likelihood detection. Further, the ITR output is provided to a sync detector 234 according to the present invention. The sync detector 234 detects the sync mark using phase information gleaned from having read the immediately preceding preamble. This information is then provided to the Viterbi detector 232 for use in sequence detection. The Viterbi detector output is then provided to the decoder 236 which decodes the encoding provided by the encoder 202. After acquiring the preamble, the sync mark detector searches for the sync mark which demarcates the beginning of the data field. When the sync mark is detected, the sync mark detector enables the Viterbi detector 232 and decoder 236.

The gain control signal provided by the loop filter/gain control unit 214 minimizes the error given by $e_i = gx_i - \bar{x}_i$ where g is the system gain. It can be shown that the system gain is updated according to $g_{i+1} = g_i - Be_i x_i = g_i - Bd_i$, where B is a constant.

According to one embodiment of the invention, the gain error term $d_i$ is given by $$d_i = (x_i - \bar{x}_i)x_i + (x_{i-1} - \bar{x}_{i-1})\bar{x}_{i-1}$$

Thus, the term gain $d_i$ is dependent on the signal error term. As discussed above, the signal error term depends of the selection of $\bar{x}_i$. According to the present invention, rather than employing a threshold detector, the selection of $\bar{x}_i$ depends upon past values of $x_i$.

In particular, in the case where the preamble signal is ideally sampled at phases $0, \pi/2, \pi, 3\pi/2$ and so on, (i.e., as for $E^{2n+1}PR4$ equalization), the ideal sample sequence takes the form [a, 0, −a, 0, a, 0, −a . . .], where a is the amplitude of the sinusoid. In this case, the error $x_i - \bar{x}_i$ is estimated, where $x_i$ is the received sample value, and $\bar{x}_i$ is computed as follows:

$$\bar{x}_i = \begin{cases} a & \text{if } |x_i - x_{i-2}| \geq |x_{i-1} - x_{i-3}| \text{ and } x_i - x_{i-2} \geq 0 \\ -a & \text{if } |x_i - x_{i-2}| \geq |x_{i-1} - x_{i-3}| \text{ and } x_i - x_{i-2} < 0 \\ 0 & \text{if } |x_i - x_{i-2}| < |x_{i-1} - x_{i-3}| \end{cases}$$

One implementation of the error signal estimator 229a described above is shown in FIG. 3A. As shown, an input signal $x_i$ is input along line 302 to a pair of delay operators 320, 322. The resulting output of the delay operators is provided to an arithmetic operator circuit 324. The signal $x_i$ is also provided along line 323 to the arithmetic operator 324. The arithmetic operator 324 performs the operation $x_i - x_{i-2}$. The output of the arithmetic operator 324 is provided to circuit 318 which determines the sign (i.e., whether the output is greater than or less than zero). The output of the circuit 318 controls a multiplexer 314, as will be explained in greater detail below.

Th output of the arithmetic operator 324 is also provided to circuit 326 which performs the absolute value operation. The resulting output is then provided to a delay operator 328 and also to an arithmetic operator 330. The output of the delay operator 328 is also provided to the arithmetic operator 330, which performs the operation $|x_i - x_{i-2}| - |x_{i-1} - x_{i-3}|$. Finally, the output of the arithmetic operator 330 is compared with zero by circuit 332 and used to control the multiplexer 316, as will be described in greater detail below.

The input signal $x_i$ is input along line 304 to the multiplexer 316 and, along lines 306 and 310 to arithmetic operators 308, 312, respectively. The arithmetic operator 308 performs the operation $x_i - a$, and the arithmetic operator 312 performs the operation $x_i + a$. The outputs of the arithmetic operators 308, 312 are provided as inputs to the multiplexer 314. The multiplexer 314 outputs one or the other based on the sign of $x_i - x_{i-2}$ provided by circuit 318. The output of the multiplexer 314 is provided as the other input to the multiplexer 316. Finally, the output of the multiplexer 316 is then selected based on the sign of $|x_i - x_{i-2}| - |x_{i-1} - x_{i-3}|$ provided by circuit 332.

In the case where the preamble signal is ideally sampled at the phases $\pi/4, 3\pi/4, 5\pi/4, 7\pi/4$ and so on (i.e., as for $E^{2n}PR4$ equalization), the ideal sample sequence takes the form [b, b, −b, −b, b, b, −b, −b, . . .] where $\sqrt{2}b$ is the amplitude of the sinusoid. In this case, the error $x_i - \bar{x}_i$ is estimated, where $x_i$ is the received sample value, and $\bar{x}_i$ is computed as follows:

$$\bar{x}_i = \begin{cases} b & \text{if } x_i - x_{i-2} \geq 0 \\ -b & \text{if } x_i - x_{i-2} < 0 \end{cases}$$

One implementation of the error signal estimator 229b described above is shown in FIG. 3B. As shown, an input signal $x_i$ is input along line 350 to a pair of delay operators 358, 360. The resulting output of the delay operators is provided to an arithmetic operator circuit 362. The signal $x_i$ is also provided along line 352 to the arithmetic operator 362. The arithmetic operator 362 performs the operation $x_i - x_{i-2}$. The output of the arithmetic operator 362 is provided to circuit 364 which determines the sign (i.e., whether the output is greater than or less than zero). The output of the circuit 364 controls a multiplexer 370, as will be explained in greater detail below.

The signal $x_i$ is input along lines 354 and 356 to arithmetic operators 366, 368, respectively. The arithmetic operator 368 performs the operation $x_i - b$, and the arithmetic operator 366 performs the operation $x_i + b$. The outputs of the arithmetic operators 366, 368 are provided as inputs to the multiplexer 370. The multiplexer 370 outputs one or the other based on the sign of $x_i - x_{i-2}$ provided by circuit 364.

An alternate method for obtaining the gain error term $d_i$ is to avoid using the slicer estimate altogether. More particularly, one method of doing so is to use the error term $$d_i = x_i^2 + x_{i-1}^2 - 4$$

Figure 1:
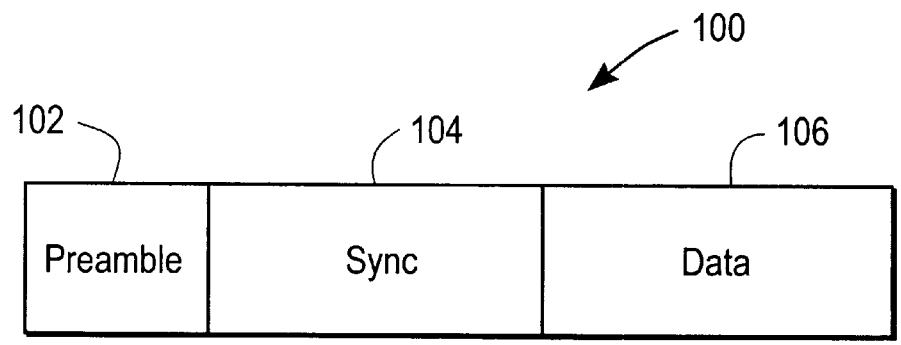
FIG. 1 is a diagram of an exemplary data format of user data.
Figure 3C:
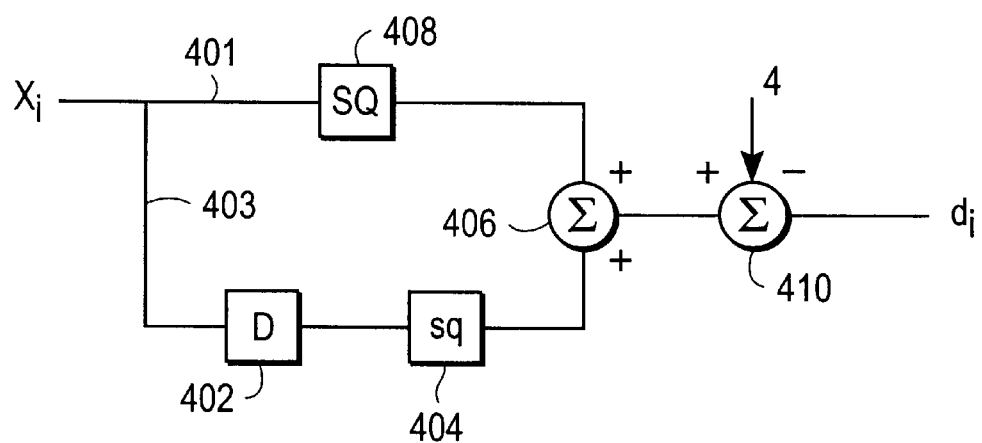

An implementation of this method for estimating the gain error term is shown in FIG. 3C. As shown therein, sample $x_i$ is input along line 401 to a squaring operator 408 and along line 403 to a delay operator 402. The output of the delay operator 403, $x_{i-1}$, is provided to a squaring operator 404. The outputs of the squaring operators 404, 408 are summed by adder 406. Finally, the output of the adder 406 is input to the adder 410, which subtracts a constant (e.g., 4). The resulting output $d_i$ is used to calculate system gain $g_i$, as described above.

It is noted that, while described above as discrete components, the gain control systems may typically implemented as software or firmware. The invention described in the above detailed description is not intended to be limited to the specific form set forth herein, but is intended to cover such alternatives, modifications and equivalents as can reasonably be included within the spirit and scope of the appended claims.

What is claimed:

1. A sampled amplitude read channel, comprising:
   means for receiving an input signal, said input signal approximating an ideal signal;

a magnetic recording channel;

an acquisition signal error estimator configured to estimate said ideal signal based on a plurality of samples of said input signal and determine a gain error based on a sum of squares of current and previous samples of said signal; and means for adjusting a signal output from said magnetic recording channel based on an output of said acquisition signal error estimator.

2. A sampled amplitude read channel according to claim 1, wherein said acquisition signal error estimator is configured to determine the gain error $d_i = x_i^2 + x_{i-1}^2 - k$, where k is a constant.

3. A sampled amplitude read channel according to claim 2, wherein k=4.

4. A sampled amplitude read channel according to claim 1, wherein said error term is based on a square of immediately preceding sample and the square of the current sample.

5. An acquisition signal error method, comprising:

receiving an input signal, said input signal approximating an ideal signal;

generating an estimate of said ideal signal based on a plurality of samples of said input signal and determining a gain error based on a sum of squares of current and previous samples of said signal; and adjusting a signal output from a magnetic recording channel based on said estimate of said ideal signal.

6. An acquisition signal error method according to claim 5, further comprising determining the gain error $d_i = x_i^2 + x_{i-1}^2 - k$, where k is a constant.

7. A method according to claim 6, wherein k=4.

8. A method according to claim 7, wherein said error term is based on a square of immediately preceding sample and the square of the current sample.

* * * * *